United States Patent Office 3,385,801
Patented May 28, 1968

3,385,801
FLAME-RESISTANT POLYURETHANES
Gail H. Birum, Kirkwood, and Richard M. Anderson and Rodney B. Clampitt, St. Louis, Mo., assignors to Monsanto Company, St. Louis, Mo., a corporation of Delaware
No Drawing. Filed May 5, 1964, Ser. No. 365,159
8 Claims. (Cl. 260—2.5)

This invention relates to the preparation of flame-resistant polyurethane materials. More particularly, this invention relates to the production of polyurethane polymers containing chemically bonded phosphorus and especially to the production of flexible and rigid polyurethane foam materials containing chemically bonded phosphorus therein.

It is known to impart flame resistance to polyurethane materials by incorporating unreactive phosphorus compounds such as the esters thereof, e.g., the trialkyl phosphates such as triethyl phosphate, trimethyl phosphate, and tris(2-chloroethyl) phosphate, into the polyol-polyisocyanate reaction mixture. However, polyurethane materials containing phosphorus in unreacted form, i.e., not chemically bonded to the polymer chain, suffer the disadvantage of being susceptible to loss of the phosphorus compound by volatilization, by leaching out by solvents or water, or by being squeezed out by pressure over a period of time. Such materials also have the disadvantage of plasticizing the polyurethane product, thus harming important properties of the polyurethane.

Those in the art have also incorporated phosphorus into polyurethane materials by using tris(hydroxyalkyl) phosphite and phosphate esters as a component of a polyol reactant mixture so that the phosphorus is chemically bonded into the polyurethane chain, e.g., as described in U.S. Patents 3,009,939 and 3,061,625. Poly(hydroxyalkyl) polyphosphate esters have also been used as polyfunctional phosphorus-containing polyol reactants for use in imparting self-extinguishing characteristics to polyurethanes made therefrom, e.g., as described in U.S. Patent 3,099,676. Also attempts have been made to build the phosphorus into the polyurethanes by transesterifying the polyol reactant with phosphite esters.

The above methods of providing chemically bonded phosphorus in polyurethane systems are deficient for at least one of two reasons: the phosphorus in the polymer system is coupled in the polymer backbone which is undesirable because of possible degradation of the polyurethane by moisture (which causes hydrolysis of the phosphorus ester linkages); or the phosphorus-containing polyol is too viscous to be metered and pumped through the conventional equipment used to prepare polyurethanes and, hence, is not acceptable to the polyurethane producers. Also, these high functional phosphorus ester polyols not only provide the risk of hydrolylic degradation of the polymer but they also produce deleterious effects on the physical properties of the polyurethane foams. Other phosphorus compounds which might be useful for imparting flame-resistance to polyurethanes react unfavorably with amine catalysts thereby deactivating the catalysts. A few examples of such phosphorus compounds include tris(2-chloroethyl) phosphite, triphenyl phosphite and tris(2,3-dibromopropyl) phosphate. It is therefore desirable to find suitable phosphorus compounds and suitable methods for using phosphorus compounds in making flame resistant polyurethane materials which contain phosphorus therein in a chemically bonded condition but not as a coupling link in the polyurethane polymer backbone and to use neutral phosphorus compounds which do not substantially react with the catalyst used, and which can be conveniently used in low enough concentration so as not to impair the good physical properties of the polyurethane containing them.

Briefly, we have found by this invention, that a fire-resistant polyurethane having chemically affixed phosphorus moieties therein, but not as a linking group in the polymer backbone, may be prepared by incorporating into the reactant mixture used to prepare the polyurethane a small but fire resistance imparting quantity of a dialkyl α-hydroxyalkylphosphonate, and allowing the reaction mixture to polymerize to a polyurethane. The fire-resistant polyurethane may be prepared in accordance with this invention by combining (A) a polyol, (B) an organic polyisocyanate, (C) a catalyst, and (D) a low molecular weight dialkyl alpha-hydroxyalkylphosphonate, and allowing the resulting mixture to polymerize in the presence of the previously unreacted dialkyl α-hydroxyalkylphosphonate to form a polyurethane containing chemically bonded phosphorus therein.

The preferred dialkyl α-hydroxyalkylphosphonates may be conveniently described by the formula

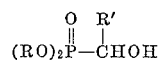

where each R is an alkyl group having from 1 to about 4 carbon atoms and R' is either hydrogen or an alkyl group of from 1 to about 3 carbon atoms. The dialkyl α-hydroxyalkylphosphonate is incorporated into the reactant mixture for making the polyurethane in amounts sufficient to impart to the finished product the desired degree of flame resistance. Generally, amounts of such a compound sufficient to provide the finished polyurethane product with from about 0.1 percent to about 5 percent by weight of phosphorus based on the total composition are used. Amounts sufficient to provide the polyurethane with from about 0.5 percent to about 3 percent phosphorus being adequate. If a polyurethane foam is being produced, there is combined with the polyol, polyisocyanate, catalyst or accelerator, and the dialkyl α-hydroxyalkylphosphonate reaction mixture (E) a foaming agent or inflatant, and (F) a surfactant. We have found that the dialkyl α-hydroxyalkylphosphonates not only serve to reduce the viscosity of the liquid reactant system to which they are added but, surprisingly, they become affixed to the polyurethanes as branches off the polymer chain without substantial detrimental effect on the valuable physical properties of the polymer. They are also substantially unreactive with amine catalysts used in polyurethane production. When the respective ingredients used to make the polyurethane are mixed in the manner prescribed by this invention, the dialkyl α-hydroxyalkylphosphonate reacts not with the polyol but with the polyisocyanate reactant as a monofunctional phosphorus ester and is found present in the polymer system as a permanently held substituent suspended from the polymer backbone.

We have discovered that by using the dialkyl α-hydroxyalkylphosphonate, a desirable reduction in viscosity of the mixture to which it is added, and an increase in the ease of handling or mixing the various components of the reaction mixture is obtained. We contemplate using the dialkyl α-hydroxyalkylphosphonate component to achieve these beneficial process effects by mixing it with any one or more of the several components of the reactant composition involved in the making of the polyurethane. All of the materials, including the dialkyl α-hydroxyalkylphosphonate, may be mixed and polymerized in one place or the dialkyl α-hydroxyalkylphosphonate component may be mixed with one or more of them, e.g., with the polyol, to reduce its viscosity before delivering the resulting polyol dialkyl α-hydroxyalkylphosphonate to mixture with remaining components.

The monomeric dialkyl α-hydroxyalkylphosphonate may be combined with the polyol and/or the polyisocyanate, or catalyst reactants in any of several ways. Each of the polyol, polyisocyanate, catalyst, and dialkyl α-hydroxyalkylphosphonate materials may be metered and pumped into a common mixing vessel, and then the resulting mixture may easily be moved to the polymerization site for use in molds, slab stock operations, etc. The dialkyl α-hydroxyalkylphosphonate may also be admixed with the polyol reactant before it is combined with the polyisocyanate reactant. It is also within the scope of the invention to mix the dialkyl α-hydroxyalkylphosphonate with the polyisocyanate before combining such mixture with the polyol reactant. However, if the polyisocyanate and the dialkyl α-hydroxyalkylphosphonate are mixed and allowed to stand at room temperature for substantial period of time, reaction may occur. Hence, it is preferred to mix the polyol, polyisocyanate, and the dialkyl α-hydroxyalkylphosphonate components either simultaneously or to first mix the polyol and the dialkyl α-hydroxyalkylphosphonate and then combine this mixture with the polyisocyanate.

The dialkyl α-hydroxyalkylphosphonates, which are used in accordance with this invention, may be described as mono-functional or mono-reactive esters, that is, they react with the isocyanates through the single hydroxyl group attached to the carbon atom which is also bonded to the phosphorus atom; they also retain the two alkyl ester groups therein. The alkyl esters groups may be of any desired carbon atom chain length, either branched or straight, but it is preferred that they be either methyl, ethyl, propyl or butyl. The α-hydroxyalkyl group bonded directly to the phosphorus atom through a carbon atom, which also has the hydroxy group bonded thereto, may be of any desired carbon chain length, but it is preferred that it have from 1 to about 4 carbon atoms also. Examples of such compounds include:

dimethyl hydroxymethylphosphonate,
diethyl hydroxymethylphosphonate,
dimethyl α-hydroxyethylphosphonate,
diethyl α-hydroxyethylphosphonate,
dimethyl α-hydroxy-β-methylpropylphosphonate,
dipropyl α-hydroxyethylphosphonate,
diisopropyl α-hydroxypropylphosphonate,
di-n-butyl α-hydroxyethylphosphonate,
di-isobutyl α-hydroxybutylphosphonate, and mixed esters such as methyl ethyl hydroxymethylphosphonate,
methyl propyl α-hydroxyethylphosphonate, and
ethyl butyl α-hydroxypropylphosphonate.

The dialkyl α-hydroxyalkylphosphonates having from 1 to 2 carbon atoms in each ester group and from 1 to 2 carbon atoms in the hydroxyalkyl group bonded directly to the phosphorus atom through carbon are especially preferred. Other dialkyl α-hydroxyalkylphosphonates which may be used are those having two alkyl groups connected to the carbon atom which is bonded to the phosphorus atom and the hydroxyl group; e.g., dimethyl α-hydroxy-α-methylethylphosphonate, dimethyl α-hydroxy-α-methylpropylphosphonate, and diethyl α-hydroxy-α-methylethylphosphonate. However, these compounds are less preferred.

Dialkyl α-hydroxyalkylphosphonates can also be used with other fire-retardant ingredients such as other phosphorus-containing materials, either of the reactive or additive types, halogen-containing materials, antimony- and boron-containing compounds and inert inorganic reinforcing materials.

An organic polyol, including diols, polyols, and polyether, polyester, and polyesteramide polyols having hydrogen atoms that are reactive with isocyanates may be used. Generally these materials have molecular weights ranging from about 62 to about 5000 and have from 2 to about 8 or 10 or more hydroxyl groups per molecule and weight percent hydroxyl conents ranging from about 0.5 to about 25%. Some have even higher hydroxyl content. They generally have hydroxyl numbers of from about 50 to as high as 500 or even 700. In the polyester-polyol type of reactant the acid number should be less than 10 and is usually as close to 0 as possible. These materials are referred to conveniently as the "polyol" reactant. The useful active hydrogen-containing polyols include the large family of adduct compounds which result when ethylene oxide, propylene oxide, 1,2- and 2,3-butylene oxide, or other alkylene oxides are added to such active hydrogen compounds as glycols and polyols represented by ethylene glycol, propylene glycol, glycerine, methyl glucoside, sucrose, sorbitol, hexanetriol, trimethylol propane, pentaerythritol as well as various alkylamines and alkylenediamines, and polyalkylenepolyamines and the like. Various amounts of these alkylene oxides may be added to the base polyol or amine molecules referred to, depending upon the intended use of the polyurethane. For example, when a final polyurethane is desired which is flexible, one would use more alkylene oxide than for a more rigid polyurethane.

For example, a polyol for use in making flexible foams could be well represented by glycerine to which sufficient propylene oxide was added to give a final hydroxyl content of about 1.7%. Such a material would have a molecular weight of about 3000 and have a molar ratio of glycerine to propylene oxide of about 1 glycerine to 50 propylene oxide. This technique of controlling rigidity or flexibility by selection of the polyol molecule and the subsequent amount of alkylene oxide added is well known to those in the art. Our method of incorporating the dialkyl α-hydroxyalkylphosphonates is equally applicable to the various materials resulting from such described technology. In addition to the glycols and the like which can serve as a base polyol molecule for addition of the alkylene oxides and thus yield the "polyol" molecule for reaction with the polyisocyanate, one can use a starting molecule which contains primary and/or secondary amine groups which have hydrogen reactive toward alkylene oxides. Here also, the quantity of alkylene oxide added depends upon the intended use of the final polyurethane products. Again, for flexible products where more alkylene oxide would be used to produce polyols with lower hydroxyl content, say, from about 0.1% to 5% or 10%, than for more rigid polyurethanes where polyols having weight percent hydroxyl content of from about 10% to 15% or 20%, typically, 10% to 12%, are often used. Representative amines which may serve as active hydrogen-containing molecules for reaction with epoxides are those having from 1 to about 6 or more amino nitrogens, examples of which are ethylamine, ethylenediamine, diethylenetriamine, triethylenetetramine, tetrapropylenepentamine and other linear saturated aliphatic alkylene amines, the important requirement being the presence of at least two, and preferably more, say 3 to 8 or 10 active hydrogen sites to which the alkylene oxide may be added. Our dialkyl α-hydroxyalkylphosphonates may be beneficially used with these polyols also. It is also well known to use the hydroxyl bearing molecules which have been prepared by esterification type reactions from polyfunctional acids or anhydrides and polyfunctional alcohols as the active hydrogen compounds used in preparing polyurethane systems. These compounds are often called polyesterpolyols. We can also use our dialkyl α-hydroxyalkylphosphonates in these systems with good results. Typical acids used for making these polyester-polyols are maleic, phthalic, succinic, fumaric, tetrahydrophthalic, chlorendic and tetrachlorophthalic acids. Typical polyols are ethylene, propylene, butylene, diethylene and dipropylene glycols, and polyethylene, polypropylene glycols and glycerine, trimethylol propane, hexanetriol, pentaerythritol, sorbitol, and the like. Where available, the above mentioned acids may be used in the anhydride form if desired.

In making the polyester-polyols, any of the various polyfunctional acids or anhydrides or mixtures thereof are caused to react with any of the glycols or polyols or mixtures thereof, using a stoichiometric excess of the hydroxyl groups such that the final polyol product contains predominantly hydroxyl end groups. The degree of hydroxyl functionality and the percent hydroxyl is easily varied to provide the desired polyols by technology and techniques which are known to those in the art. We are not concerned with these techniques but rather with the use of these well known products along with the dialkyl α-hydroxyalkylphosphonates to provide reduced flammability in the final polyurethane product.

In the art and technology of making polyurethanes, it is also known to employ what is called prepolymer techniques. This is a technique wherein part of the reaction involved in making a polyurethane is carried out yielding a prepolymer of increased molecular weight and with either resultant end groups of hydroxyls or isocyanates depending upon the stoichiometry used in making this prepolymer. This prepolymer is then used to prepare the desired final polyurethane product by reacting it with either a polyisocyanate or one of the desired polyols, depending, as has been mentioned above, on whether the terminal groups of the prepolymer are hydroxyls or isocyanates, respectively. We can use our dialkyl α-hydroxyalkylphosphonates advantageously in these systems also.

Broadly, any of the prior art polyesters, polyisocyanate - modified - polyester prepolymers, polyesteramides, polyisocyanate - modified - polyesteramides, alkylene gylcols, polyisocyanate - modified - alkylene glycols, polyoxyalkylene glycols and polyisocyanates - modified - polyoxykylene glycols, etc., having free reactive hydrogens and especially hydroxyl groups may be employed for the production of the fire-resistant polyurethanes in accordance with this invention.

Polyols as exemplified above are reacted with organic polyisocyanates to prepare polyurethanes. Broadly, the term "polyisocyanate" as used herein, means any of the prior art polyisocyanates that have been or could be used to prepare polyurethanes. The term includes monomeric di- and polyisocyanates and prepolymers of polyols and polyisocyanates where the isocyanate groups are in excess so that there are free available isocyanate groups available to react with additional polyol and the dialkyl α-hydroxyalkylphosphonate when they are combined with the polyisocyanate to form the fire-resistant polyurethane polymer of this invention. The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene - 1,2 - diisocyanate, and the arene polyisocyanates having from 2 to 3 isocyanate groups per molecule and from 1 to 3 phenylene rings as the only aromatic cyclic ring system such as m-phenylene diisocyanate, 2,4-toulene diisocyanate, 1,6-toluenediisocyanate, 3,3'-dimethyl- as well as various other polyisocyanates such as 4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3' - dichloro - 4,4' - biphenylene diisocyanate, triphenylmethane triisocyanate, 1,5-naphthalene diisocyanate, and the like.

Useful catalyst, and/or initiator materials which may be used as the "catalyst" component include the tertiary amines either individually or in mixture like N-alkylmorpholines, and N,N-dialkylcyclohexylamines, where the alkyl groups are methyl, ethyl, propyl, butyl etc., also triethylamine, tripropylamine, tributylamine, triamylamine, pyridine, quinoline, dimethylpiperidine, dimethylhexahydroaniline, diethylhexahydroaniline, the reaction products of N,N'-diethylaminoethanol and phenyl isocyanate, esterimides, 1-methyl-4-(dimethylaminoethyl) piperizaine, N-ethylethylenimine, N,N,N',N'-tetramethyl-1,3 - butanediamine, triethylamine, 2,4,6 - tri-dimethylaminomethyl)phenol, tetramethylguanidine, N-ethylmorpholine, 2-methylpyrazine, dimethylaniline, and nicotine; and metallic compounds including those of bismuth, lead, tin, titanium, iron, antimony, uranium, cadmium, cobalt, thorium, aluminum, mercury, zinc, nickel, cerium, molybdenum, vanadium, copper, manganese, zirconium, etc., examples of which include bismuth nitrate, lead 2-ethylhexoate, lead benzoate, lead oleate, sodium trichlorophenate, sodium propionate, lithium acetate, potassium oleate, tetrabutyl tin, butyl tin trichlorate, stannic chloride, tributyl tin o-phenylphenate, stannous octoate, stannous oleate, dibutyl tin di(2-ethylhexoate), di(2-ethylhexyl) tin oxide, titanium tetrachloride, tetrabutyl titanate, ferric chloride, antimony trichloride, cadimum diethyl dithiophosphate, thorium nitrate, triphenylaluminum, nickelocene, etc. The catalyst component either as single compound or as a mixture may be used in conventional amounts, which usually ranges from about 0.05 to about 4 parts of catalyst per 100 parts of polyol-isocyanate reactants by weight.

Polyurethanes are used in both the unfoamed and in the so called "foam" form. In general, a foamed polyurethane is formed when low boiling liquids, or normally gaseous blowing agents, or inflatants are generated by or incorporated into the polyurethane-forming reactants. Often the heat of reaction causes these low boiling liquid or gaseous blowing agents to volatilize, thus foaming the composition. In some cases the boiling point of the blowing agent is chosen to be well below room temperature and the composition can be made to foam even before any substantial reaction between the polyol and the polyisocyanate reactants has occurred or before any heat is evolved. This technique is sometimes called frothing. Useful blowing agents, i.e., foam inducing agents, which may be added when foams are desired include water, either alone or admixed with other components, e.g., as an aqueous solution of a tertiary amine catalyst, and the chlorinated and fluorinated alkanes having from 1 to about 2 carbon atoms, such as the chlorofluoromethanes and chlorofluoroethanes, which are commercially available under various trademarks, one of such being "FREON."

When blowing or foaming agents are incorporated into the reactant composition there may also be incorporated into the mixture various conventional foam stabilizers to control the amount and quality of the foamed polyurethane obtained. Used for this purpose are various surfactants including various silicone compounds and silicone oil mixtures, e.g., dimethyl-siloxane and alkylsilanepolyoxyalkylene glycol copolymers sold under various trade names such as "Silicone L–520" by Union Carbide and "Dow Corning 199" by Dow Corning Corporation, etc. For foaming or blowing polyurethane polymers there may be used from about 5 to about 50 parts by weight of blowing agent and about 0.1 to 3 parts of the foam stabilizing agent per 10 parts by weight of the polyol and polyisocyanate reactants.

While preparing the fire resistant polyurethanes in accordance with this invention, the dialkyl α-hydroxyalkylphosphonate may be added to a "1-shot" mixture of the polyol polyisocyanate, and catalyst ingredients before hardening. It may also be added to a prepolymer prepared from the active hydrogen compound and the polyisocyanate previous to or simultaneously with the activator mixture. The polyol and polyisocyanate reactants are usually in proportions sufficient to provide an NCO/OH ratio of about 1.05/1. In this invention the polyisocyanate is used in proportions sufficient to provide sufficient isocyanate groups to be equivalent to amounts of both the hydroxyl content and the amount of dialkyl α-hydroxyalkylphosphonate. Usually a small excess of isocyanate reactant is used to insure complete reaction. Thus, it is preferred to combine the polyisocyanate, polyol, and dialkyl α-hydroxyalkylphosphonate in proportions sufficient to provide an NCO/OH plus dialkyl α-hydroxyalkylphosphonate ratio of about 1.05/1 although the art is aware that strict adherence to this ratio is not essential. As an example, in flexible foams where the blowing is often accomplished using $CO_2$ which results from reaction of water with isocyanate, large excesses of isocyanate are often used. The reaction mixture thus obtained may be metered and pumped during the induction period to the polymerization site where it may be readily poured, sometimes into suitable molds, by use of conventional equipment. The hardened pieces or foams are rendered flame-retardant by the inclusion therein of the dialkyl α-hydroxyalkylphosphonate in quantities of say from 2% to about 20% by weight, based on the total composition. Substantial flame resistance may be obtained with much smaller quantities, say, as little as from 0.5 to 1% by weight. The phosphorus contained in the resulting polyurethane is uniquely bonded therein and does not substantially impair the good mechanical properties of the polyurethane product obtained.

The polyurethanes obtained according to the process of this invention may be used in any of the fields where polyurethanes have previously been used. The flexible foamed phosphorus-containing polyurethanes of this invention may be used for seat cushions, upholstery, crash pads, etc. The rigid polyurethanes are very useful in structural applications, for example, as insulation panels, and for other building purposes. Non-foamed polyurethanes produced by this invention are useful in the production of textile fibers, as resin bases in the manufacture of cureable coating compositions. They are also useful as impregnating adhesives in the fabrication of laminates for woods and other fibrous materials.

We have found that when the dialkyl α-hydroxyalkylphosphonates are incoroprated into the polyurethane foam system in the manner described herein, the resulting polyurethane foam is a high-quality, flame-resistant foam at low concentrations of the compounds. The following examples will better illustrate the nature of the present improvement in terms of processability, flame resistance, and polyurethane quality.

EXAMPLE 1

To illustrate the advantages of using the lower molecular weight dialkyl α-hydroxyalkylphosphonates as flame retardant materials in polyurethanes in accordance with this invention over other α-hydroxyalkylphosphonic compounds, the following related compounds were selected, compounded into polyurethanes where possible, and tested and compared for flame retardant efficiency.

(A) Bis(dipropyleneglycol) 1 - hydroxyethylphosphonate (B) Hydroxymethylphosphonic acid (C) Dimethyl 1-hydroxyethylphosphonate.

Test compound A was prepared as follows:

A bis (dipropyleneglycol) hydrogenphosphonate was first prepared by the reaction of a commercially available tris(dipropyleneglycol) phosphite ester with phosphorus acid, followed by treatment with propylene oxide. The $P^{31}$ NMR spectrum had the characteristic doublet at −22.8 and +6.3 p.p.m. (relative to $H_3PO_4$) for a hydrogenphosphonate.

A 175 g. portion of this bis(dipropyleneglycol) hydrogenphosphonate and 22.2 g. of acetaldehyde were mixed and stirred while 10 ml. of a 25 percent solution of sodium methoxide in methanol was added dropwise. During the addition, an exothermic reaction was noted and the temperature was controlled at 40°–50° C. with cooling. After the reaction subsided and the addition of the sodium methoxide in methanol solution was completed, the mixture was warmed and stirred at 40°–50° C. for 1 hour. Five ml. of acetic acid was added and the reaction mixture was stripped of by-product to a pot temperature of 70° C./13 mm., giving 198 g. of bis-dipropyleneglycol) 1-hydroxyethylphosphonate, $n_D^{25}$ 1.4579. The $P^{31}$ NMR spectrum had a single peak at −26 p.p.m.

Test compound B, hydroxymethylphosphonic acid, was prepared as described in Canadian Journal of Chemistry, volume 31, p. 976.

Test compound C, dimethyl α-hydroxyethylphospho-nate, may be prepared, e.g., by reacting dimethyl hydrogenphosphonate with acetaldehyde, following the procedure described in British Patent 682,706.

The ingredients necessary to prepare polyurethane foams containing one of test compounds A, B, and C at 5 percent by weight based on the total composition were formulated in the following proportions and mixed as described below. Formulation: 5% by weight of the respective test compounds A or C, or 3% of sample B (A) Ingredient: Parts by wt.
  Compound A _____ 20.3
  Propoxylated methyl glucoside [1] _____ 146.9
  Silicone L–520° _____ 1.6
  Freon 11 _____ 58.3
  Tetramethylbutanediamine _____ 4.0
  Polyisocyanate A _____ 180.5

(B) Ingredient:
  Test Compound B _____ 12.2
  Propoxylated methyl glucoside [1] _____ 138.9
  Silicone L–520 _____ 1.6
  Freon 11 _____ 58.3
  Tetramethylbutanediamine _____ 4.0(8.0)
  Polyisocyanate A _____ 196.6

(C) Ingredient:
  Test Compound C _____ 20.3
  Propoxylated methyl glucoside—as above ___ 147.9
  Silicone L–520 _____ 1.6
  Freon 11 _____ 58.3
  Tetramethylbutanediamine _____ 4.0
  Polyisocyanate A _____ 179.4

[1] Methyl glucoside treated with sufficient propylene oxide to obtain a product having about 13.2% hydroxyl, by weight.

(1) Sample B.—Test Compound B was compounded at 3% by weight in two attempts to prepare foams therefrom, the second attempt using twice the standard amount of catalyst (8.0 parts).

(2) "Silicone L–520.—is a trademark name for an alkylsilanepolyoxyalkylene polymer silicone oil foam stabilizer sold by Union Carbide. (See U.S. Patent 2,834,748.)

(3) "Freon 11."—is a trademark of Matheson Company for trichlorofluoromethane used as a blowing agent.

(4) "Polyisocyanate A."—an unpurified isomeric mixture of methylenebisphenylisocyanates, some molecules containing 3 aromatic rings and 3 isocyanate groups for a total NC0 content of about 32%.

For each formulation, all of the components were blended to a homogeneous mixture, and then the polyisocyanate reactant was added and the mixture was blended thoroughly.

The samples were stirred for 20 seconds and poured into paper lined boxes. The rise time in Sample A was 80 seconds; in Sample C it was 90 seconds. The gel time in Sample A was 75 seconds; in Sample C it was 80 seconds. Sample B would not foam in 15 minutes. In a second attempt with Sample B twice the amount of catalyst was used. The foam rose slowly for 5 minutes and then collapsed. It was not suitable for testing for flammability.

Foam samples A and C were then tested for flame resistance according to the standard test described in ASTM–D1692–59T. The results were as follows:

Sample, 5% conc.: Rating

A_____ Burning (100% burn).
C_____ Non-burning (0% burned).

EXAMPLE 2

This example illustrates the preparation of fire-resistant polyurethane foams by the method of this invention in which the dialkyl α-hydroxylphosphonate was blended with each of the following polyols in an amount sufficient to provide the final polyurethane with from about 0.75% to about 2.5% by weight of phosphorus therein. For this example, dimethyl 1-hydroxyethylphosphonate (DMHEP)

was used.

| Polyol | Percent OH of Polyol | Wt. percent P provided by DMHEP |
|---|---|---|
| Methyl glucoside and propylene oxide | 13.2 | 0.6, 0.9, 1.0, 1.2, 1.3, 1.5, 1.7, 2.5. |
| Sorbitol and propylene oxide | 14.7 | 1.1, 1.7. |
| Sucrose and propylene oxide | 12.7 | 1.1, 1.7. |

Each of the above starting polyols, methyl glucoside, sorbitol, and sucrose was reacted with sufficient propylene oxide to obtain the stated percent hydroxyl.

In each of these compositions of polyol and dimethyl 1-hydroxyethylphosphonate, a significant decrease in viscosity was observed. The polyisocyanate used was either polyisocyanate A or toluenediisocyanate. The catalyst used was tetramethylbutanediamine. The surfactant used was L-520. The blowing agent was trichlorofluoromethane sold under the trademark Freon 11. These ingredients were mixed and prepared as described in Example 1. Each of these compositions foamed rapidly (less than 3 minutes) to a non-tacky, fine quality, fire-resistant polyurethane foam.

EXAMPLE 3

This example illustrates a typical preparation of a flexible polyurethane using a low molecular weight dialkyl hydrogenphosphonate therein as a flame-retardant ingredient. For this example diethyl 1-hydroxybutylphosphonate is incorporated into the following ingredient recipe:

A mixture of 120.0 gms. of a polyoxypropylene triol having a hydroxyl number of 56.3 and a molecular weight of about 3000 (prepared from glycerine and propylene oxide), 0.06 g. of 1-methyl-4-(dimethylaminoethyl)piperazine, 0.36 g. of stannous octoate, 0.60 g. of N-methylmorpholine, 1.20 g. of a silicone surfactant (L-520), 3.48 g. of distilled water, and 10.2 g. of diethyl 1-hydroxybutylphosphonate. To this mixture there is added 53.7 g. of toluenediisocyanate which is used in amount sufficient to react with both the polyol and the diethyl 1-hydroxybutylphosphonate. The mixture is stirred to homogeneity, and then poured into an aluminum foil lined container where foaming progresses. The resulting flexible polyurethane foam is a high quality material of reduced flammability.

EXAMPLE 4

This example illustrates the use of diethyl hydroxymethylphosphonate in polyurethane foam compositions in accordance with this invention at three different weight percent concentrations. In these three formulations the diethyl hydroxymethylphosphonate was used at 0.6, 0.75, and 1.0 weight percent of phosphorus in the total composition.

| Ingredient, Wt. g: | 0.6% P | 0.75% P | 1.0% P |
|---|---|---|---|
| Diethyl hydroxymethyl phosphonate | 12.9 | 16.1 | 21.5 |
| Propoxylated methyl glucoside | 155.2 | 152.4 | 144.7 |
| "Silicone L-520" | 1.6 | 1.6 | 1.6 |
| "Freon 11" | 48.5 | 48.5 | 48.5 |
| Stannous Octoate | .5 | .5 | .5 |
| 1-methyl-4-(dimethylaminoethyl)piperazine | 1.6 | 1.6 | 1.6 |
| "Polyisocyanate A" | 190.4 | 189.2 | 188.5 |

All of the ingredients in each composition except the "polyisocyanate A" were blended to a homogeneous mixture and then the polyisocyanate A component was added and blended into the other ingredients, and then the resulting mixtures were poured into a prepared container and allowed to polymerize and rise. Each of these formulations gave good quality fire-resistant rigid foams.

In summary, this invention provides for the incorporation of dialkyl alpha - hydroxyalkylphosphonates in polyurethanes. Those of particular interest for this use are those of the formula

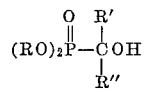

wherein each R is an alkyl of from 1 to about 4 carbons, R' is either hydrogen or alkyl of from 1 to about 3 carbons, and R'' is either hydrogen or the methyl group, but is preferably hydrogen.

What is claimed is:

1. A fire resistant polyurethane prepared by incorporating into the reactant mixture used to prepare the polyurethane a small but fire resistance imparting amount of a dialkyl α-hydroxyalkylphosphonate of the formula $$(RO)_2 \overset{O}{\underset{}{P}} - \overset{R'}{\underset{R''}{C}} OH$$

wherein each R is an alkyl group of from 1 to about 4 carbon atoms, R' is selected from the group consisting of hydrogen and alkyl groups of from 1 to about 3 carbon atoms, and R'' is selected from the group consisting of hydrogen, and the methyl group and allowing the resulting mixture to polymerize to a polyurethane.

2. A fire-resistant polyurethane which is produced by reacting a composition comprising (A) a polyol, (B) an organic polyisocyanate, (C) a catalyst, and (D) a dialkyl α-hydroxyalkylphosphonate of the formula

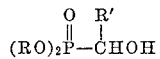

wherein each R is an alkyl group having from 1 to about 4 carbon atoms, and R' is selected from the group consisting of hydrogen and alkyl groups having from 1 to about 3 carbon atoms, said polyurethanes containing from about 0.1 percent to about 5 percent by weight of phosphorus contributed by the dialkyl α-hydroxyalkylphosphonate.

3. A fire-resistant polyurethane foam which is produced by reacting a composition comprising (A) a polyol, (B) an organic polyisocyanate, (C) a catalyst, (D) a dialkyl α-hydroxyalkylphosphonate of the formula

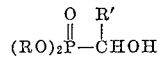

wherein each R is an alkyl group having from 1 to about 4 carbon atoms, and R' is selected from the group consisting of hydrogen and alkyl groups having from 1 to about 3 carbon atoms, (D) a foaming agent or inflatant, and (F) a surfactant, said polyurethane containing from about 0.1 percent to about 5 percent by weight of phosphorus contributed by the dialkyl α-hydroxyalkylphosphonate.

4. A fire-resistant polyurethane foam as described in claim 3 wherein the polyol (A) is a 2 to 4 carbon alkylene oxide adduct of a member of the group consisting of 1,1,3-propylenetris (4-phenol), glycerine, methyl glucoside, sorbitol, sucrose, trimethylol propane, hexanetriol, linear saturated aliphatic amines having from 1 to about 6 amino nitrogens and from 2 to about 8 amino hydrogens, and mixtures thereof, said adducts having percent hydroxyl contents of from about 0.5 percent to about 25 percent, the organic polyisocyanate (B) is an arene polyisocyanate having from 2 to 3 isocyanate groups per molecule and from 1 to 3 phenylene rings as the only aromatic cyclic ring system therein, the catalyst (C) is selected from the group consisting of tertiary amines and mixtures of tertiary amines, the dialkyl α-hydroxyalkylphosphonate (D) has from 1 to 2 carbon atoms in each alkyl ester group and from 1 to 2 carbon atoms in the α-hydroxyalkyl group, the foaming agent (E) is a chlorofluoroalkane having from 1 to 2 carbon atoms, and the surfactant (F) is a silicone oil.

5. A fire-resistant polyurethane foam as described in claim 4 wherein the polyol (A) is a mixture of propylene oxide adducts of 1,1,3-propylenetris(4-phenol) and glycerine, which mixture has a percent hydroxyl content of from about 10 percent to about 12 percent, the organic polyisocyanate (B) is toluenediisocyanate, the catalyst (C) is tetramethylbutanediamine, the dialkyl α-hydroxyalkylphosphonate (D) is dimethyl 1-hydroxyethylphosphonate, the foaming agent (E) is a trichlorofluoromethane, and the surfactant (F) is an alkylsilane-polyoxyalkylene glycol silicone oil.

6. A fire-resistant polyurethane foam as described in claim 4 wherein the polyol (A) is a propylene oxide adduct of methyl glucoside having a percent hydroxyl content of from about 12 to 14 percent, the organic polyisocyanate (B) is an impure isomeric mixture of methylenebisphenylisocyanates, some molecules containing 3 aromatic rings and 3 isocyanate groups and having a total isocyanate content of from about 31 to about 33 percent, the catalyst (C) is tetramethylbutanediamine, the dialkyl α-hydroxyalkylphosphonate (D) is dimethyl 1-hydroxyethylphosphonate, the foaming agent (E) is trischlorofluoromethane, and the surfactant (F) is an alkylsilane-polyoxyalkylene glycol silicone oil.

7. A process for preparing a fire resistant polyurethane which comprises incorporating into the reactant mixture used to prepare the polyurethane a small but fire resistance imparting amount of a dialkyl α-hydroxyalkylphosphonate of the formula

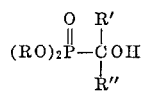

wherein each R is an alkyl group of from 1 to about 4 carbon atoms, R′ is selected from the group consisting of hydrogen and alkyl groups of from 1 to about 3 carbon atoms, and R″ is selected from the group consisting of hydrogen and methyl group, and allowing the resulting reactant mixture to polymerize to form a polyurethane.

8. A process as described in claim 7 wherein the dialkyl α-hydroxyalkylphosphonate is diethyl 1-hydroxyethylphosphonate.

References Cited

UNITED STATES PATENTS

| | | | |
|---|---|---|---|
| 2,254,124 | 8/1941 | Stevens et al. | 260—953 |
| 2,579,810 | 12/1951 | Fields | 260—953 |
| 2,593,213 | 4/1952 | Stiles | 260—953 |
| 3,134,742 | 5/1964 | Wismer et al. | 260—2.5 |
| 3,142,651 | 7/1964 | Friedman | 260—2.5 |

FOREIGN PATENTS 919,067    2/1963    Great Britain.

DONALD E. CZAJA, *Primary Examiner.*

LEON J. BERCOVITZ, *Examiner.*

J. J. KLOCKO, *Assistant Examiner.*